Feb. 27, 1940.  W. P. WILLS  2,192,022
MEASURING AND CONTROL APPARATUS
Filed Oct. 29, 1938   2 Sheets-Sheet 1

INVENTOR.
WALTER P. WILLS
BY George M. ~~~~
ATTORNEY.

Feb. 27, 1940.  W. P. WILLS  2,192,022

MEASURING AND CONTROL APPARATUS

Filed Oct. 29, 1938   2 Sheets-Sheet 2

INVENTOR
WALTER P. WILLS
BY George M. Musehamp
ATTORNEY

Patented Feb. 27, 1940

2,192,022

UNITED STATES PATENT OFFICE 2,192,022

MEASURING AND CONTROL APPARATUS

Walter P. Wills, Philadelphia, Pa., assignor to The Brown Instrument Company, Philadelphia, Pa., a corporation of Pennsylvania Application October 29, 1938, Serial No. 237,641

12 Claims. (Cl. 172—239)

The present invention relates to improvements in automatic recording and control systems and apparatus therefor.

More specifically, the invention relates to systems and apparatus for determining the magnitude or changes in magnitude of a measured condition, such as mechanical, chemical, electrical, physical, etc., and including suitable provisions for making a record of the changes and/or for maintaining said measured condition at a predetermined value. The invention is especially useful in pyrometric recording and control systems where it is desired to record and control the conditions of temperature at one or more remote points, for example, in furnaces or kilns.

In accordance with my invention, upon change in magnitude of a measured condition, a normally balanced electrical network becomes unbalanced and initiates operation of a driving system for effecting a rebalancing adjustment of the network, and during the rebalancing operation an additional effect is produced which, jointly with the unbalance of the network controls the driving system to obtain rebalance in a minimum of time without overshooting. Such provisions for preventing overshooting of the balance point of the network are desirable since the inertia of the various mechanically connected parts tend to so operate as to carry the driving system and associated rebalancing means beyond the proper position of rebalance. When such a condition of overshooting prevails, the network then becomes unbalanced in the opposite direction and initiates operation of the driving system to obtain rebalance but again the necessary regulation is exceeded to thereby set up a continuous hunting of the driving system about the balance point.

The need for such "anti-hunting" provisions in recording and controlling apparatus has long been recognized and various methods have been proposed heretofore for obtaining the same. One such prior art method for preventing hunting is disclosed in Patent 1,827,520 issued to Thomas R. Harrison on October 13, 1931, for Recording and control system and apparatus therefor, in which the speed of rebalance of an electrical network is effected in accordance with the extent of unbalance thereof, and mechanically moving means are provided for anticipating the true balance position. In one other prior art method means are provided in the form of a generator driven by the driving system for obtaining an electromotive force proportional to the speed of the driving system. This electromotive force is introduced into the measuring or detector circuit in opposition to the unbalance electromotive force of the condition responsive network and operates to produce a condition of simulated rebalance of said network before the latter is actually rebalanced to thereby anticipate the true balance position of the network. As a result the driving system is slowed down before the balance position is reached and then gradually eases into said balance position without exceeding that position.

A specific object of my present invention is to provide anti-hunting means for use in recording and controlling apparatus in which an electromotive force proportional to the speed of rebalancing of the measuring network is obtained without requiring the use of a generator or other physically moving device additional to the rebalancing motive means.

A further object of the invention is to provide a measuring and/or controlling system which is characterized by its compactness, simplicity, and effectiveness, and which may be operated from a commercial alternating current supply source without the use of transformers and power rectifiers.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
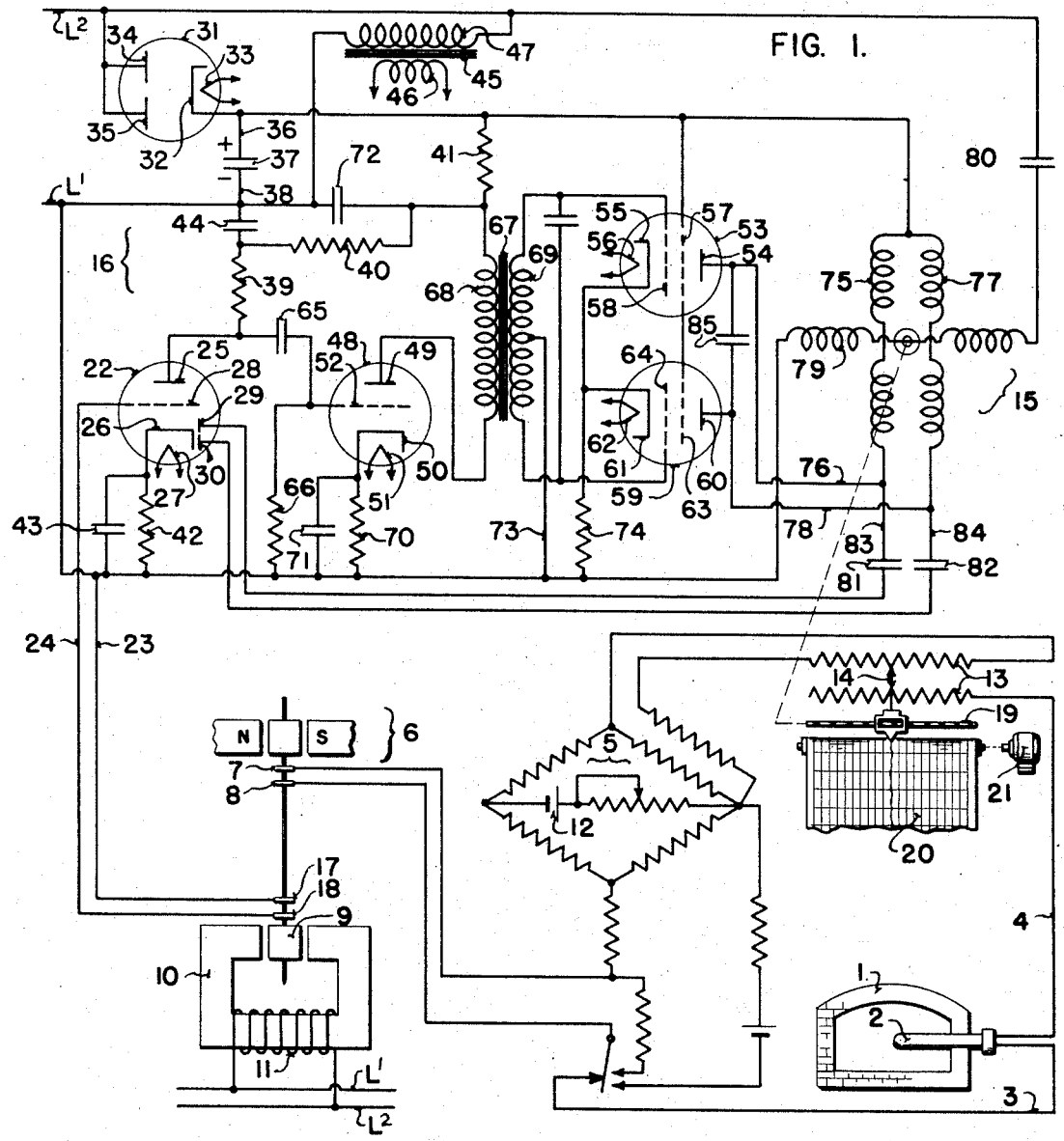
Fig. 1 is a diagrammatic illustration of a self-balancing potentiometric network utilizing the invention.

In Fig. 1 of the drawings, an arrangement including an electronic device to be described is illustrated for producing effects in accordance with the extent of unbalance of a potentiometric network which controls the electronic device and is unbalanced in accordance with variations in a quantity to be measured, and in which because of the small magnitude of the unbalanced electromotive forces produced in the network, it is not practical nor desirable to have the said effects directly produced by the potentiometric network.

More specifically, an arrangement is illustrated in Fig. 1 for measuring and recording the temperature of a furnace 1 in the interior of which a thermocouple 2 is inserted and is responsive to slight changes in the temperature therein. The terminals of the thermocouple are connected by conductors 3 and 4 to the terminals of a null point potentiometric network 5 which may be of any suitable type such as the Brown potentiometric network disclosed in the Harrison Patent 1,898,124 issued February 21, 1933.

The moving coil of a galvanometer 6 is connected in the conductor 3 by means of pigtails or slip rings 7 and 8 and a pick-up coil 9 which is positioned in an alternating magnetic field, is connected to the pivot of the galvanometer coil, and is arranged to be rotated therewith. The pick-up coil is positioned between the poles of a suitable field structure 10 on which is wound a field winding 11 which is energized from alternating current supply conductors $L^1$ and $L^2$ and is so arranged with respect to the poles of the field structure 10 that when the galvanometer moving coil is in its undeflected position, the pick-up coil is in zero inductive relation to the alternating magnetic field set up in the field structure. When the galvanometer moving coil deflects in one direction or the other, the pick-up coil deflects accordingly and as a result, an alternating voltage, in phase with or 180° out of phase with the line voltage, will be induced in the pick-up coil. The potentiometer network 5 is of a well-known type and it is sufficient for the present purposes to know that the potentiometer network includes a circuit branch including the thermocouple 2 and an opposing circuit branch including a source of known potential such as a battery 12, resistances 13, a variable portion of which may be connected into the opposed branches by means of a sliding contact 14 whereby the respective effects of the variable and known sources are made equal and opposite and the galvanometer moving coil is then rendered undeflected when the circuit is balanced for a given value of the E. M. F. of the thermocouple 2 with contact 14 in a corresponding position along resistances 13. The position of the contact 14 is then a measure of the value of the thermocouple E. M. F. and may serve as a measure of the temperature to which it is exposed.

This form of my invention is concerned with the means by which the contact 14 is adjusted back and forth along resistances 13 in response to galvanometer deflection and as shown includes a reversible motor 15 which is adapted to be selectively energized for rotation in one direction or the other from an electronic amplifier 16. When the thermocouple voltage changes, the galvanometer moving coil will be deflected in one direction or the other and thereby the pick-up coil will be rotated into inductive relation with the alternating magnetic field set up by the field structure 10 resulting in the induction of an alternating voltage in the pick-up coil. The phase and amplitude of the alternating voltage so induced is determined by the direction and extent of deflection respectively. This induced alternating voltage is connected through suitable pigtails or slip rings 17 and 18 to the input terminals of amplifier 16 so that depending upon the direction of galvanometer deflection, the motor 15 will be energized for rotation in a corresponding direction to effect an adjustment of the sliding contact 14 along resistances 13 to rebalance the potentiometric circuit.

The shaft of motor 15 is connected in any convenient manner to a screw shaft 19 and the potentiometer contact 14 is mounted on a carriage carried by shaft 19 and is adapted to be moved in one direction or the other as the shaft 19 is rotated. Thus when the motor 15 is energized for rotation as a result of change in the thermocouple E. M. F., the motor will effect an adjusting movement of contact 14 along resistances 13 in the proper direction until the potentiometer circuit is again balanced. The galvanometer deflection will then be reduced to zero and the motor will come to rest with the contact 14 at a new position along resistances 13, which position will then be a measure of the temperature of the interior of furnace 1.

If desired, a pen may be mounted on the carriage which carries the potentiometer contact 14 and arranged in cooperative relation with a recorder chart 20 to thereby provide a continuous record of the temperature of the interior of furnace 1.

The electronic amplifier 16 referred to includes an electronic valve 22 on the input circuit of which the voltage induced in pick-up coil 9, as a result of galvanometer deflection, is applied by conductors 23 and 24. Valve 22 is a heater type duplex-diode triode and, as shown, includes a triode section and a diode section in one envelope. The triode section includes an anode 25, a cathode 26, a heater filament 27, and a control grid 28, and the diode section includes a pair of diodes 29 and 30 arranged in cooperative relation with the cathode 26.

Anode voltage is supplied the triode section of valve 22 from the alternating current supply conductors $L^1$ and $L^2$ through a circuit which utilizes the rectifying action of a rectifier valve 31. Valve 31 may be of any well known type for example, an R. C. A. type 6X5, as illustrated, and having a cathode 32, a heater filament 33, and a pair of anodes 34 and 35 the latter of which are connected together.

The circuit referred to for supplying anode voltage to the triode section of valve 22 may be traced from the supply conductor $L^2$ to the anodes 34 and 35 of valve 31, cathode 32, and a conductor 36 to one terminal of a condenser 37 which terminal constitutes the positive side of a half wave rectifying unit. The negative terminal of condenser 37 is connected by a conductor 38 to the supply conductor $L^1$. Condenser 37 operates to smooth out the pulsations in the rectified current flow through valve 31 which impresses a definite constant voltage across its terminals. As illustrated, the anode 25 of valve 22 is connected to the positive terminal of condenser 37 through a series of resistances 39, 40 and 41, and the cathode 26 is connected to the negative terminal thereof through a biasing resistance 42 shunted by a condenser 43. A condenser 44 connected from the point of engagement of resistances 39 and 40 to the negative terminal of condenser 37 may desirably be provided for further filtering the anode voltage impressed on the triode section of valve 22.

Energizing current is supplied the heater filaments 27 and 33 of valves 22 and 31, respectively, from the secondary winding 46 of a transformer 45. Transformer 45 is a step-down transformer having a line voltage primary winding 47 whose terminals are connected to the supply conductors L¹ and L². The secondary winding 46 also supplies energizing current to the heater filaments 51, 56 and 62 of electronic valves 48, 53, and 59 respectively, which valves are also included in the amplifier 16, and will be described further hereinafter. While the connecting leads from the heater filaments 27, 33, 51, 56 and 62 to the transformer secondary winding 46 have not been shown in order not to confuse the drawings, the said filaments may be connected in any suitable manner to the terminals of winding 46, for example, in parallel across said terminals.

The output circuit of the triode section of valve 22 is resistance capacity coupled by a condenser 65 and a resistance 66 to the input circuit of valve 48, and the output circuit of the latter is coupled by a transformer 67 having a primary winding 68 and a center tapped secondary winding 69, to the input circuits of the valves 53 and 59 which, as shown, are connected in push-pull relation. Valve 48 is a heater type triode and includes an anode 49, a cathode 50, the heater filament 51 and a control grid 52. Anode voltage is supplied valve 48 from the terminals of condenser 37 through a circuit which may be traced from the positive terminal of condenser 37 through resistance 41, the primary winding 68 of transformer 67 and therethrough to the anode 49, cathode 50 and a biasing resistance 70 shunted by condenser 71 to the negative terminal of condenser 37. As shown, a condenser 72 connected from the point of engagement of resistance 41 and the transformer primary winding 68 to the negative terminal of condenser 37 may desirably be provided for further filtering the anode voltage supplied valve 48. The center tap on the transformer secondary winding 69 is connected by a conductor 73 to the negative terminal of condenser 37 and is also connected through a biasing resistance 74 to the cathodes 55 and 61 of valves 53 and 59, respectively. Valves 53 and 59 are heater type tetrodes and as, illustrated, valve 53 includes an anode 54, a cathode 55, the heater filament 56, a screen grid 57, and a control grid 58, and valve 59 includes an anode 60, a cathode 61, the heater filament 62, a screen grid 63, and a control grid 64. One terminal of the transformer secondary winding 69 is connected to the control grid 58 of valve 53 and the other terminal of the secondary winding is connected to the control grid 64 of valve 59.

Anode voltage is supplied valve 53 from the terminals of condenser 37 through a circuit which includes one phase winding 75 of the reversible electrical motor 15 and may be traced from the positive terminal of the condenser 37 through phase winding 75, a conductor 76, the anode 54 of valve 53, cathode 55, and the biasing resistance 74, to the negative terminal of the condenser. Similarly, anode voltage is supplied valve 59 from the terminals of condenser 37 through a circuit which includes a motor phase winding 77 which is oppositely disposed on the motor 15 with respect to the winding 75. The anode circuit of valve 59 may be traced from the positive terminal of condenser 37 to the phase winding 77, a conductor 78, anode 60 of valve 59, cathode 61, and the biasing resistance 74 to the negative terminal of the condenser.

In operation when the potentiometric network 5 is unbalanced, the pick-up coil 9 will be deflected in one direction or the other to cause the induction therein of an alternating voltage which is in phase with the line voltage or displaced 180° therefrom. This alternating voltage is applied by means of conductors 23 and 24 to the input circuit of the triode section of valve 22, and is effective to render the valve 22 alternately conductive and non-conductive, the periods of such alternate conduction and non-conduction being determined by the direction of deflection of pick-up coil 9. The pulsating currents conducted by valve 22 produce a pulsating potential drop across resistance 39 which is impressed through condenser 65 and resistance 66 to the input circuit of valve 48 to thereby render the latter alternately non-conductive and conductive during the periods when the valve 22 is conductive and non-conductive, respectively. The flow of pulsating anode current conducted by valve 48 through the transformer primary winding 68 causes the induction of an alternating voltage across the terminals of the transformer secondary winding 69, which voltage is impressed on the input circuits of valves 53 and 59. The alternating voltage which appears across the terminals of the transformer winding 69 swings the potentials of the control grids 58 and 64 in opposite phase at a frequency corresponding to the supply line frequency, and thereby renders valves 53 and 59 alternately conductive and non-conductive, one valve being conductive while the other is non-conductive. The resulting pulsating current flows through the motor phase windings 75 and 77 result in energization of the motor 15 for rotation in one direction or the other depending upon the phase relation of the voltage induced in the transformer secondary winding 69 with respect to the line voltage.

Figure 2:
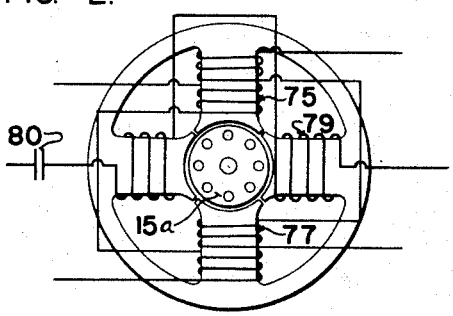
Fig. 2 illustrates in detail the reversible electrical motor employed in the arrangement of Fig. 1.

As illustrated more or less diagrammatically in Fig. 2, the motor 15 is of the induction variety and includes three windings, namely the windings 75 and 77 referred to hereinbefore and a winding 79 which is connected directly to the alternating current supply conductors L¹ and L² through a condenser 80. Due to the action of condenser 80, the current which flows through winding 79 will lead the line current by approximately 90°. As shown in Fig. 2, motor 15 includes a squirrel cage rotor 15a and two pairs of oppositely disposed field poles. Winding 79 is wound on one pair of said oppositely disposed field poles, and windings 75 and 77 are wound on the other pair of poles, one half of winding 75 being wound on a portion of one of the field poles which is adjacent the rotor 15a, and the other half being wound on a portion of the other field pole remote from said rotor. Similarly, one half of winding 77 is wound on a portion of the last mentioned pole which is adjacent the rotor 15a, and the other half of winding 77 is wound on a portion of the first mentioned pole remote from said rotor.

In operation when the voltage induced in the transformer secondary winding 69 is zero, valves 53 and 59 will conduct a steady value of current and motor 15 will not be energized for rotation in either direction. When a voltage of one phase or of opposite phase with respect to the line voltage is induced in the transformer secondary winding 69, however, magnetic fields will be set up by the windings 75 and 77 which fields are so positioned in space and time with respect to the magnetic fields set up by the winding 79, that a resultant rotating magnetic field will be produced in the rotor 15a which is effective to cause rotation of the latter in one direction or the other depending upon the phase of said voltage induced in the winding 69.

In order that the speed of motor 15 may be as great as possible during rebalancing without overshooting of the new balance point of the potentiometric network 5 and consequent hunting taking place, means have been provided to insure that the motor speed and rate of change of its speed is substantially proportional to the extent of unbalance. This result is obtained by introducing into the network a voltage whose magnitude is a function of the motor speed, and is effective to cause deenergization of the motor.

This damping feature, although obtained electrically herein, is substantially the same as that disclosed in the Harrison Patent 1,827,520 mentioned hereinbefore in which the rate of rebalance of a potentiometer measuring circuit and an arresting of the motive means when the rebalancing movement has been proportional to the unbalance are controlled by mechanical means. Thus, as the sliding contact 14 approaches its new balanced position the potentiometer unbalance will be reduced, and if the motor speed is then such that it would ordinarily coast beyond the balanced position due to its inertia, the opposing voltage which is introduced into the network will be appreciably greater than the voltage impressed on the amplifier input circuit by the pick-up coil 9, and will effect deenergization of the motor, and thereby produces a positive damping action which will check the motor speed before the balanced position is reached, and gradually reduce it to zero as the unbalance is reduced to zero.

Specifically, the means illustrated in Fig. 1 for obtaining such an anti-hunting effect includes the cathode 26 and the diode plates 29 and 30 of valve 22 and a pair of condensers 81 and 82 connected from the diode plates to a respective motor phase winding 75 and 77. As illustrated, the point of engagement of winding 75 and the anode 54 of valve 53 is connected by a conductor 83 in which the condenser 81 is inserted to the diode plate 29 and the point of engagement of winding 77 and the anode 60 of valve 59 is connected by a conductor 84 in which the condenser 82 is inserted to the diode plate 30. The other ends of windings 75 and 77 are connected together and to the positive terminal of condenser 37 and as noted hereinbefore the cathode 26 of valve 22 is connected through a biasing resistance 42 to the negative terminal of the condenser 37. It will thus be noted the circuits including the condensers 81 and 82 and the diode plates 29 and 30 are connected in parallel to the electronic valves 53 and 59 and the biasing resistance 74. Direct current will not flow through these shunting circuits due to the presence of condensers 81 and 82 therein, which condensers effectively open circuit the connecting leads from the motor windings 75 and 77 to the diode plates 29 and 30 in respect to the flow of direct current. Alternating or pulsating current, however, is permitted to flow through the said shunting circuits and operate in a manner elaborated on further herein to impress an electromotive force across the biasing resistance 42 in the cathode circuit of valve 22, which electromotive force is a function of the speed of rotation of motor 15.

This electromotive force for preventing hunting of motor 15 is comprised of two components one of which is developed in the motor windings 75 and 77 as a result of the flow of energizing current therethrough, and the other of which is induced in the motor windings as a result of transformer action between the windings 75 and 77 and the winding 79. In respect to the component produced as a result of the flow of energizing current through the windings it is noted that when valve 53 or 59 is rendered conductive, the resulting flow of energizing current through the corresponding motor winding 75 or 77 will produce a potential drop across the said winding, which potential drop will be alternating due to the action of condenser 85 connected between the windings and the magnitude of which is determined by the impedance of said winding. In respect to the component obtained by virtue of transformer action between the windings, it is noted that when rotor 15a is stationary no lines of the magnetic flux set up by winding 79 link any turns of windings 75 and 77 since, as noted hereinbefore, the field poles on which the windings 75 and 77 are wound are displaced 90° with respect to the field poles on which winding 79 is wound, and hence the electromotive force induced in windings 75 and 77 by transformer action will be zero. On rotation of rotor 15a, however, the magnetic flux set up by winding 79 will be distorted, and some lines of flux will link the windings 75 and 77 to cause the induction of an electromotive force therein. By providing a condenser 85 connected between the terminals of windings 75 and 77 which are connected to the anodes 54 and 60 of valves 53 and 59, the magnitude of the voltage induced in windings 71 and 72 as a result of motor rotation will be greatly enhanced. The magnetic flux set up by winding 79 is distorted in one direction or the other, depending upon the direction of rotation of rotor 15a, and the extent of distortion is dependent upon the speed of rotation.

It is noted that when the potentiometric network 5 is balanced, the flow of current through the motor windings 75 and 77 will be unidirectional and fixed in value whereby the only potential drop across the motor windings will be a non-fluctuating or steady one, the motor then being stationary so that no feedback action will take place due to the action of condensers 81 and 82. Thus, the anti-hunting means provided operate to effect a control action only when the motor is rotating or energized for rotation.

As will become readily apparent, by providing a feedback circuit as illustrated and described, this electromotive force derived as a result of the flow of motor energizing currents and as a result of motor rotation may be utilized to prevent hunting of the motor. Specifically, the said electromotive force is impressed across the biasing resistance 42 in the cathode circuit of valve 22 through the rectifying diode section including the plates 29 and 30 and the cathode 26 so that irrespective of the phase of the said electromotive force, or phases of the components which comprise said electromotive force if said components should be out of phase, a potential drop will be produced across the resistance 42 which will render the control grid 28 negative with respect to the cathode 26.

Resistance 42 is so proportioned that when the input signal impressed on the amplifier 16 by the pick-up coil 9 is large, the feed-back voltage will be ineffective to prevent rotation of the motor and will only operate to reduce the effect of the input signal. As the motor 15 subsequently effects rebalance of the potentiometer network 5 and the input signal falls off, the feed-back voltage becomes more and more predominant and will finally cause deenergization of the motor to thereby quickly reduce its speed. As the motor speed falls off, the feed-back voltage diminishes and, as a result, the effect of the input signal is again increased. This action continues until the potentiometer network 5 is rebalanced and permits the motor to be extremely fast in its operation without overshooting.

It is noted the feed-back action described for preventing hunting of motor 15 is a delayed action, a desirable feature when a large motor starting torque is required. This delayed action is obtained partly as a result of the action of condenser 43 which operates to prevent any change in current flow in the feed-back circuit immediately effecting a corresponding change in the potential drop across resistance 42, and partly due to the fact that the full feed-back electromotive force is not obtained until motor 15 is rotating.

Figure 3:
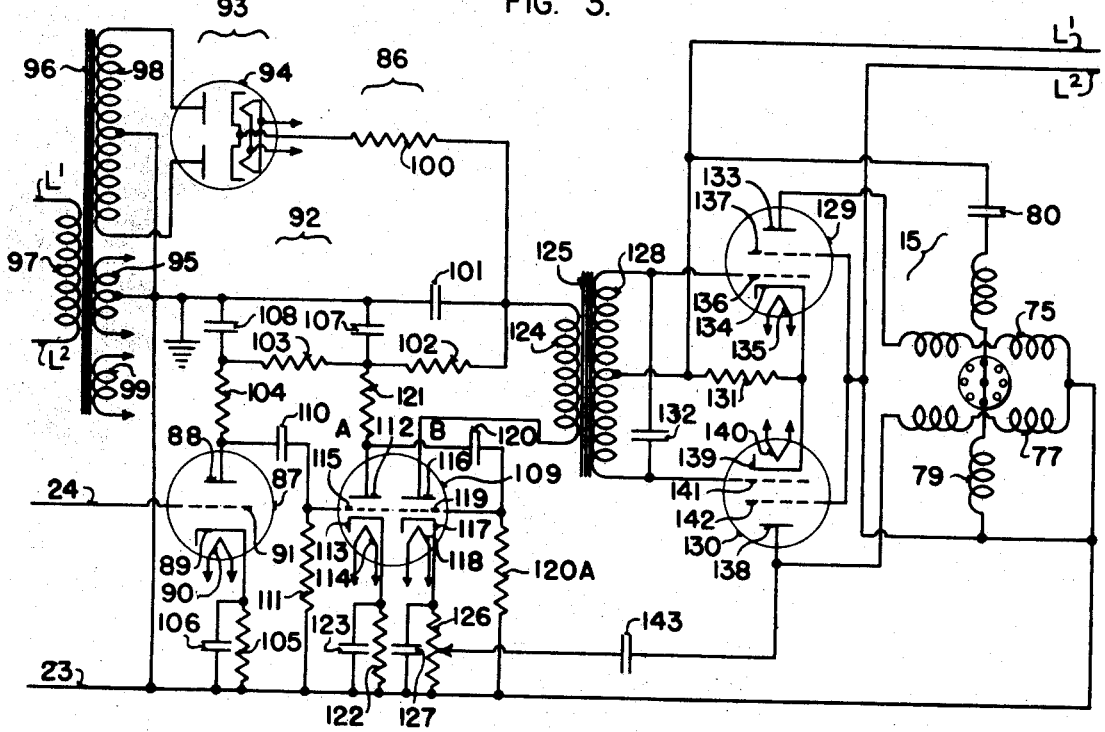
Fig. 3 illustrates a modification of the arrangement of Fig. 1.

In Fig. 3, I have illustrated more or less diagrammatically a modified arrangement for controlling the driving means for rebalancing the potentiometric network 5 of the Fig. 1 arrangement in a minimum of time without overshooting. As illustrated, an electronic amplifier 86 is employed in lieu of the amplifier 16 of the Fig. 1 arrangement and one of the condensers 81 or 82 have been dispensed with in obtaining an antihunting effect to prevent overshooting of the motor 15.

Specifically, the amplifier 86 includes an electronic valve 87 which valve may be a heater type triode having an anode 88, a cathode 89, a heater filament 90 and a control electrode 91 and having its input circuit connected by conductors 23 and 24 to the terminals of the pick-up coil 9. Anode voltage is supplied the valve 87 from the terminals of a suitable filter 92 which filter is connected in circuit between the valve 87 and a rectifier 93. The rectifier 93 is a conventional full wave rectifier employing a rectifier valve 94 including two heater type diodes in one envelope. Energizing current is supplied the heater filaments of the diodes from the low voltage secondary winding 99 of a transformer 96 which transformer also includes a line voltage primary winding 97, a high voltage secondary winding 98 and a second low voltage secondary winding 95. The anode of one diode of valve 94 is connected to one terminal of the winding 98 and the anode of the second diode is connected to the other terminal of the winding. The cathodes of the diodes are connected together and through a resistance 100 to the positive terminal of the filter 92 and the negative terminal of the latter is connected to a center tap on the winding 98. The negative terminal of the filter may desirably be connected to ground potential as shown.

The filter 92 includes a condenser 101 connected directly across its terminals and has its positive terminal connected to the anode 88 of valve 87 through resistances 102, 103, and 104 and its negative terminal connected to the cathode 89 of said valve through a biasing resistance 105 having a condenser 106 connected in shunt therewith. The point of engagement of resistances 102 and 103 is connected by a condenser 107 to the negative terminal of the filter, and the point of engagement of resistances 103 and 104 is connected by a condenser 108 thereto.

Energizing current is supplied the heater filament 90 of valve 87 from the low voltage transformer winding 95, which winding also supplies energizing current to the heater filaments of electronic valves 109, 129 and 130. The flow of current through valve 87 is normally maintained at a steady average value due to the action of the biasing resistance 105 but when an alternating or pulsating potential is applied to the input terminals of the valve, the conductivity of the valve is alternately increased and decreased resulting in a pulsating potential drop appearing across the resistance 104 in the output circuit of the valve.

The output circuit of valve 87 is resistance capacity coupled by a condenser 110 and a resistance 111 to the input circuit of valve 109. Valve 109 is a heater type valve including two triodes in one envelope. Each triode includes anode, cathode, and control electrode elements, and for convenience, the triodes will be referred to hereinafter as the triode A and the triode B. Triode A includes an anode 112, a cathode 113, a heater filament 114, and a control electrode 115, and has its input circuit coupled to the output circuit of valve 87. Triode B includes an anode 116, a cathode 117, a heater filament 118, and a control electrode 119 and has its input circuit coupled to the output circuit of triode A by means of a condenser 120 and a resistance 120A.

Anode voltage is supplied the triodes A and B from the terminals of filter 92 and as shown, the anode of triode A is connected through a resistance 121 to the point of engagement of resistances 102 and 103 and the cathode is connected through a biasing resistance 122 shunted by condenser 123 to the negative terminal of the filter; and the anode of triode B is connected through the primary winding 124 of a transformer 125 to the positive terminal of the filter and the cathode 117 is connected through a biasing resistance 126 shunted by a condenser 127 to the negative terminal of the filter. As illustrated, the transformer 125 includes a center tapped secondary winding 128, the terminals of which are connected to a respective control electrode of a pair of electronic valves 129 and 130 and the center tap of which is connected through a biasing resistance 131 to the cathodes of the valves which, as shown, are connected together. Thus, the output circuit of triode B is inductively coupled to the input circuits of the valves 129 and 130, and as shown, a condenser 132 may desirably be connected across the terminals of the secondary winding 128 for tuning the transformer 125 to the frequency it is desired to amplify.

Valves 129 and 130 are heater type tetrodes, valve 129 including an anode 133, a cathode 134, a heater filament 135, a control electrode 136, and a screen electrode 137; and valve 130 including an anode 138, a cathode 139, a heater filament 140, a control electrode 141, and a screen electrode 142. Anode voltage may be supplied the valves 129 and 130 directly from the supply conductors L¹ and L², as shown, or may be supplied thereto from a suitable transformer energized by the supply line current, if desired. Winding 75 of motor 15 is connected in the anode circuit of valve 129, winding 77 of said motor is connected in the anode circuit of valve 130, and the remaining motor winding 79 is connected to the supply line conductors through a condenser 80 as in the Fig. 1 arrangement.

In operation, when the potentiometric network 5 is unbalanced to cause the induction of an alternating voltage in the pick-up coil 9, the resulting amplified pulsating current flows through the transformer primary winding 124 will cause the induction of an alternating voltage across the terminals of the transformer secondary winding 128 which voltage is impressed on the input circuits of valves 129 and 130. This alternating voltage swings the potentials of the control electrodes 136 and 141 in opposite phase at a frequency corresponding to the supply line frequency and thereby renders one valve or the other valve non-conductive depending upon the phase of the voltage induced in the transformer secondary winding 128 with respect to the supply line voltage. The resulting pulsating current flows through the motor winding 75 or 77 results in energization of the motor 15 for rotation in one direction or the other depending upon the phase relation of the voltage induced in the transformer secondary winding 128 with respect to the line voltage and thereby upon the direction of unbalance of the potentiometric network 5.

In this arrangement, means are provided for preventing hunting of the motor 15 in the form of a conductor connected between the point of engagement of the motor winding 77 and the anode 138 of valve 130 and the cathode 117 of valve 109, which conductor includes a condenser 143, and a conductor from the negative terminal of the biasing resistance 126 to the other terminal of the winding 77. This connection impresses a voltage across the biasing resistance 126 in the cathode circuit of triode B which voltage varies proportionately with the speed of rotation of motor 15 and is of a polarity depending upon the direction of rotation of the motor so that as the motor gains speed, a voltage is impressed on resistance 126 which renders the signal impressed on the control grid 119 of triode B by the triode A insufficient to control the conductivity of the triode B and tends to energize motor 15 for rotation in the opposite direction. As the motor speed subsequently falls off, the voltage through resistance 126 diminishes and as a result, the effect of the input signal impressed on the triode B by the triode A is again increased. This action continues until the primary network 5 is rebalanced and permits rebalancing in a minimum of time without overshooting taking place. The degree of damping obtained may be varied by adjusting the point of connection of the conductor which includes the condenser 143 therein along the biasing resistance 126.

Figure 4:
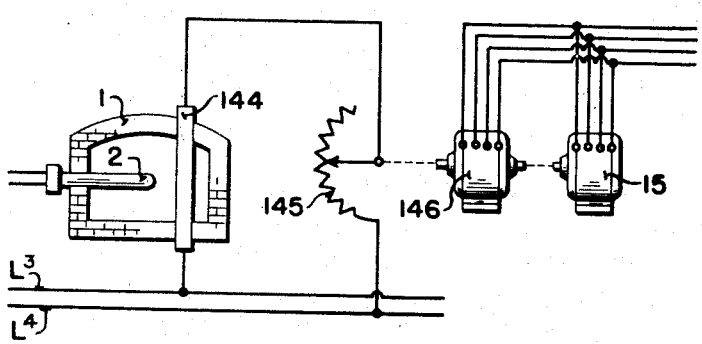
Fig. 4 is a diagrammatic illustration of the use of the invention in a control system.

It will be apparent the motor 15 may be employed to operate a control valve for controlling the supply of heating agent to the furnace 1 of the Fig. 1 arrangement to the temperature of which the thermocouple 2 is responsive, or another motor desirably operated together with the motor 15 may be so employed. For example, as shown in Fig. 4, the furnace 1 to the heat of which the thermocouple 2 is responsive is heated by a resistance 144 which is connected to electric supply conductors L³ and L⁴ through a rheostat 145, the adjustment of which is effected by motor 146. The motor 146 may be exactly like motor 15 and is connected in parallel therewith. The mechanical connection of the rheostat 145 to the motor 146 is such as to increase and decrease the supply of electric current to the resistance 144 as the temperature to which the thermocouple 2 is responsive drops below or rises above a predetermined level.

Subject matter disclosed in this application and not claimed is being claimed in a copending application Serial No. 231,565, filed by Thomas R. Harrison for Measuring and control apparatus.

While in acordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. A system comprising an electrical network, means for producing an unbalanced electrical effect in said network, a device adjustable to reduce said unbalanced electrical effect, a motor for adjusting said device, said motor having a winding, means for establishing a magnetic field in said motor which field does not normally link the turns of said winding to any substantial extent, but is adapted on rotation of said motor to be distorted to produce an electrical effect in said winding, a detector responsive to said unbalanced electrical effect and having a connection to said winding for controlling the selective energization thereof, and means for arresting the operation of said motor substantially at a desired point including an electrical connection presenting high resistance to the flow of direct current therethrough but readily passing fluctuating current superimposing said second mentioned electrical effect on said unbalanced electrical effect.

2. A system comprising an electrical network, means for producing an unbalanced electrical effect in said network, a device adjustable to reduce said unbalanced electrical effect, a motor for adjusting said device, said motor having a winding, means for establishing a magnetic field in said motor which field does not normally link the turns of said winding to any substantial extent, but is adapted on rotation of said motor to be distorted to produce an electrical effect in said winding, a detector responsive to said unbalanced electrical effect and having a connection to said winding for controlling the selective energization thereof, and means for arresting the operation of said motor substantially at a desired point including an electrical connection having a rectifier and a capacitative reactance therein superimposing said second mentioned electrical effect on said unbalanced electrical effect.

3. A system comprising an electrical network, means for producing an unbalanced electromotive force in said network, a device adjustable to reduce said unbalanced electromotive force, a motor for adjusting said device, said motor having a winding, means for establishing a magnetic field in said motor which field does not normally link the turns of said winding to any substantial extent but is adapted on rotation of said motor to cause the induction of a fluctuating electromotive force in said winding, a detector responsive to said unbalanced electromotive force and having a connection to said winding for controlling the selective energization thereof, and means for arresting the operation of said motor substantially at a desired point including an electrical connection having rectifying means and capacitative reactance means therein superimposing said second mentioned electromotive force on said unbalanced electromotive force.

4. A system comprising an electrical network, means for producing an unbalanced electromotive force in said network, a device adjustable to reduce said unbalanced electromotive force, a motor for adjusting said device, said motor having a winding, means for establishing a magnetic field in said motor which field does not normally link the turns of said winding to any substantial extent, but is adapted on energization of said winding to react therewith to produce rotation of said motor in one direction or the other, said magnetic field being adapted to be distorted on rotation of said motor to cause the induction of an electromotive force in said winding, a detector responsive to said unbalanced electromotive force and having a connection to said winding for controlling the selective energization thereof, and means for arresting the network regulation substantially at a desired point including an electrical connection having rectifying means and capacitative reactance means therein opposing said second mentioned electromotive force to said unbalanced electromotive force.

5. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to one of said windings for controlling the selective energization thereof, means for energizing the other of said windings to establish a magnetic field in said motor which field does not normally link the turns of said first mentioned winding to any substantial extent but is adapted on energization of said first mentioned winding to react therewith to produce rotation of said motor in one direction or the other, said magnetic field being adapted to be distorted on rotation of said motor to cause the induction of an electromotive force in said first mentioned winding, and means for arresting the network regulation substantially at a desired point including an electrical connection having a rectifier and a condenser therein opposing said second mentioned electromotive force to said unbalanced electromotive force.

6. A system comprising an electrical network, means for producing an unbalanced electromotive force in said network, a device adjustable to reduce said unbalanced electromotive force, a motor for adjusting said device, said motor having a plurality of windings, an electronic amplifier having an input circuit and an output circuit, means impressing said unbalanced electromotive force on the input circuit of said amplifier, means connecting the output circuit of said amplifier to one of said motor windings, means for energizing another of said motor windings to establish a magnetic field in said motor which field does not normally link the turns of said first mentioned motor winding to any substantial extent but is adapted on energization of said first mentioned winding to react therewith to produce rotation of said motor in one direction or the other, said magnetic field being adapted to be distorted on rotation of said motor to cause the induction of an electromotive force in said first mentioned winding, and means for arresting the network regulation substantially at a desired point including an electrical connection having a rectifier and a condenser therein opposing said second mentioned electromotive force to said unbalanced electromotive force.

7. A system comprising an electrical network, means for producing an unbalanced electromotive force in said network, a device adjustable to reduce said unbalanced electromotive force, a motor for adjusting said device, said motor having a plurality of windings, electronic amplifying means for amplifying said unbalanced electromotive force and a connection from the output circuit of said amplifying means to at least two of said motor windings, means for energizing another of said motor windings to establish a magnetic field in said motor which field does not normally link the turns of said first mentioned motor windings to any substantial extent but is adapted on energization of said first mentioned windings to react therewith to produce rotation of said motor in one direction or the other accordingly as one or the other of said first mentioned windings is energized, said magnetic field being adapted to be distorted on rotation of said motor to cause the induction of an electromotive force in each of said first mentioned windings and means for arresting the network regulation substantially at a desired point including electrical conducting means each including a rectifier and a condenser therein opposing the electromotive forces induced in said first mentioned windings to said unbalanced electromotive force.

8. A system comprising an electrical network, means for producing an unbalanced electromotive force in said network, a device adjustable to reduce said unbalanced electromotive force, a motor for adjusting said device, said motor having a plurality of windings, electronic amplifying means for amplifying said unbalanced electromotive force and having its output circuit connected to at least two of said motor windings and adapted to selectively energize one or the other of said windings to produce rotation of said motor in one direction or the other, means for energizing another of said motor windings, and means for arresting the network regulation substantially at a desired point including an electrical connection having only resistance, capacitance and rectifying means therein directly connecting at least one of said first mentioned motor windings to the input circuit of said amplifying means.

9. The combination with an electrical network having an electrical characteristic to be regulated of an automatic regulator therefor including an electrical driving motor, an impedance connected in said network and adapted to be adjusted by said motor to restore said electrical characteristic to a predetermined state on deviation therefrom, said motor having a winding connected to said regulator means for establishing a magnetic field in said motor which field does not normally link the turns of said winding but is adapted on rotation of said motor to be distorted to cause the induction of an electromotive force in said winding, and means for arresting the network regulation substantially at a desired point including an electrical connection presenting high resistance to the flow of direct current therethrough but readily passing fluctuating current applying said electromotive force to control said regulator.

10. The combination with an electrical network having an electrical characteristic to be regulated of an automatic regulator therefor including an electrical driving motor, an impedance connected in said network and adapted to be adjusted by said motor to restore said electrical characteristic to a predetermined state on deviation therefrom, said motor having a winding connected to said regulator means for establishing a magnetic field in said motor which field does not normally link the turns of said winding but is adapted on rotation of said motor to be distorted to cause the induction of an electromotive force in said winding, and means for arresting the network regulation substantially at a desired point including an electrical connection having a rectifier and a condenser therein applying said electromotive force to control said regulator.

11. The combination with an electrical network having an electrical characteristic to be regulated of an automatic regulator therefor including an electrical driving motor, an impedance connected in said network and adapted to be adjusted by said motor to restore said electrical characteristic to a predetermined state on deviation therefrom, said motor having at least two windings, one of which is energized by said regulator to selectively control the direction of rotation of said motor, means for energizing the other of said windings to establish a magnetic field in said motor which field does not normally link the turns of said first mentioned winding but is adapted on rotation of said motor to be distorted to cause the induction of an electromotive force therein, and means for arresting the network regulation substantially at a desired point including an electrical connection having a rectifier and a condenser therein applying said electromotive force to control said regulator.

12. The combination with an electrical network having an electrical characteristic to be regulated of an automatic regulator therefor including an electrical driving motor, an impedance connected in said network and adapted to be adjusted by said motor to restore said electrical characteristic to a predetermined state on deviation therefrom, said motor having a plurality of windings one of which is energized by said regulator, means for energizing another of said windings to establish a magnetic field in said motor which field does not normally link the turns of said first mentioned winding to any substantial extent but is adapted on energization of said first mentioned winding to react therewith to produce rotation of said motor, said magnetic field being adapted to be distorted on rotation of said motor to cause the induction of an electromotive force in said first mentioned winding, and means for arresting the network regulation substantially at a desired point including an electrical connection having a rectifier and a condenser therein applying said electromotive force to control said regulator.

WALTER P. WILLS.